(12) United States Patent
Misaizu et al.

(10) Patent No.: US 9,835,523 B2
(45) Date of Patent: Dec. 5, 2017

(54) COMBUSTION PRESSURE DETECTION DEVICE, AND INTERNAL COMBUSTION ENGINE EQUIPPED WITH COMBUSTION PRESSURE DETECTION DEVICE

(71) Applicants: Tsuyoshi Misaizu, Kitasaku-gun (JP); Kazuo Takahashi, Kitasaku-gun (JP); Yoshihiko Soga, Kitasaku-gun (JP); Hiromichi Yasuda, Toyota (JP)

(72) Inventors: Tsuyoshi Misaizu, Kitasaku-gun (JP); Kazuo Takahashi, Kitasaku-gun (JP); Yoshihiko Soga, Kitasaku-gun (JP); Hiromichi Yasuda, Toyota (JP)

(73) Assignees: CITIZEN FINEDEVICE CO., LTD, Yamanashi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 14/380,561

(22) PCT Filed: Feb. 27, 2013

(86) PCT No.: PCT/JP2013/055168
§ 371 (c)(1),
(2) Date: Aug. 22, 2014

(87) PCT Pub. No.: WO2013/129483
PCT Pub. Date: Sep. 6, 2013

(65) Prior Publication Data
US 2015/0128687 A1 May 14, 2015

(30) Foreign Application Priority Data
Feb. 27, 2012 (JP) ................. 2012-040311

(51) Int. Cl.
*G01M 15/08* (2006.01)
*G01L 23/10* (2006.01)
*F02D 35/02* (2006.01)

(52) U.S. Cl.
CPC ............ *G01M 15/08* (2013.01); *G01L 23/10* (2013.01); *F02D 35/023* (2013.01)

(58) Field of Classification Search
USPC ............... 73/114.16, 114.17, 114.18, 114.19
See application file for complete search history.

(56) References Cited

U.S. PATENT DOCUMENTS 5,583,295 A  12/1996  Nagase et al.
5,900,541 A  5/1999  Morris
(Continued)

FOREIGN PATENT DOCUMENTS

CN  1582473 A  2/2005
CN  101614609 A  12/2009
(Continued)

OTHER PUBLICATIONS

Aug. 26, 2015 EESR issued in European Application No. 13754798.0.
(Continued)

*Primary Examiner* — Eric S McCall
(74) *Attorney, Agent, or Firm* — Oliff PLC (57) ABSTRACT

A combustion pressure detection device for detecting combustion pressure inside a combustion chamber of an internal combustion engine, the combustion pressure detection device being attachable to a communication hole communicating an inside of a cylinder head configuring the combustion chamber and an outside thereof, the combustion pressure detection device includes: a housing; and a piezoelectric element and the like that are located in the housing and detect the combustion pressure. The housing has an
(Continued)

attachment structural part attachable to the communication hole, the attachment structural part has a third outer peripheral surface to which a first seal member is attachable, and a inclined surface to which a second seal member is attachable, and the inclined surface is arranged at a front end side in a direction to the combustion chamber relative to the third outer peripheral surface when the combustion pressure detection device is attached to the communication hole.

8 Claims, 8 Drawing Sheets

(56) References Cited

U.S. PATENT DOCUMENTS

| | | | |
|---|---|---|---|
| 2001/0015402 A1 | 8/2001 | Murai et al. | |
| 2005/0180305 A1 | 8/2005 | Yokota et al. | |
| 2007/0289370 A1 | 12/2007 | Hirose et al. | |
| 2009/0217913 A1 | 9/2009 | Toyoda | |
| 2009/0320576 A1 | 12/2009 | Borgers et al. | |
| 2014/0109661 A1* | 4/2014 | Pottiez | G01L 23/04 73/114.18 |

FOREIGN PATENT DOCUMENTS

| | | |
|---|---|---|
| CN | 104145108 A | 11/2014 |
| DE | 0831166 C | 2/1952 |
| DE | 10 2009 010 876 A1 | 9/2009 |
| EP | 2821625 A1 | 1/2015 |
| JP | U-57-166147 | 10/1982 |
| JP | H05-180060 A | 7/1993 |
| JP | H06-86049 U | 12/1994 |
| JP | A-07-253364 | 10/1995 |
| JP | H08-28584 A | 2/1996 |
| JP | H08-122187 A | 5/1996 |
| JP | 2001-182937 A | 7/2001 |
| JP | A-2005-180305 | 7/2005 |
| JP | 2005-340069 A | 12/2005 |
| JP | 2007-309293 A | 11/2007 |
| JP | A-2008-002809 | 1/2008 |
| JP | A-2009-115556 | 5/2009 |
| JP | 2009-203913 A | 9/2009 |
| JP | A-2009-203913 | 9/2009 |
| JP | A-2011-038946 | 2/2011 |
| JP | 2013174211 A | 9/2013 |

OTHER PUBLICATIONS

Apr. 9, 2013 International Search Report issued in International Application No. PCT/JP2013/055168.

* cited by examiner

COMBUSTION PRESSURE DETECTION DEVICE, AND INTERNAL COMBUSTION ENGINE EQUIPPED WITH COMBUSTION PRESSURE DETECTION DEVICE

TECHNICAL FIELD

The present invention relates to a combustion pressure detection device, and an internal combustion engine equipped with the combustion pressure detection device.

BACKGROUND ART

Conventionally, prevention of combustion gas from leaking to the outside of an internal combustion engine by interposing a seal member between a combustion pressure detection device that is mounted on the internal combustion engine and detects pressure inside a combustion chamber and a structural body which configures the combustion chamber and to which the combustion pressure detection device is attached has been suggested.

For example, a stress detection device described in Patent Document 1 has a housing that is formed into a cylinder and made of a stainless steel, a screw part is formed on the outer circumferential surface of the housing, and the screw part is screwed into a screw hole that is provided to penetrate a cylinder head of an engine block. At this time, a gasket as a seal ring between a hexagonal part of the housing and the engine block is pressed to the outer surface of the cylinder head.

CITATION LISTS

Patent Literature

Patent Document 1: Japanese Patent Application Laid-Open Publication No. Hei 7-253364

SUMMARY OF INVENTION

Technical Problem

Since high-temperature combustion gas flows into a space between a housing and a cylinder head at a combustion chamber side relative to a sealed section between the housing of a combustion pressure detection device and the cylinder head which configures the combustion chamber and to which the combustion pressure detection device is attached, there is a possibility that loss of detection within one wavelength due to heat expansion of components configuring the combustion pressure detection device or the like or a detection error such as displacement of a reference position within repeating wavelengths (temperature drift) may occur. Moreover, if the combustion gas flows into a fastening part between the housing and the cylinder head, there is a possibility that heat strain may occur by a difference in a heat expansion coefficient between the housing and the cylinder head and the fastening part may adhere.

To avoid this, a seal at the front end of the housing by interposition of a seal member between the front end surface of the housing and the cylinder head and compression of the seal member in the fastening direction of the pressure detection device by the housing and the cylinder head is considered. However, in such a configuration, there is a possibility that the housing or the seal member may be broken because it cannot withstand the fastening force due to downsizing of the pressure detection device, a space may be generated at the sealed part between the cylinder head and the pressure detection device, the gas inside the combustion chamber may flow into the space, and aggravation of fuel consumption or performance due to deformation of the detection device or unstable combustion may occur.

An object of the present invention is to suggest a device that can suppress inflow of the combustion gas to the space formed with the cylinder head even when the front end of the combustion pressure detection device is downsized.

Solution to Problem

According to the object, the present invention is a combustion pressure detection device for detecting combustion pressure inside a combustion chamber of an internal combustion engine, the combustion pressure detection device being attachable to a communication hole communicating an inside of a cylinder head configuring the combustion chamber and an outside thereof, the combustion pressure detection device including: a housing; and a detector that is located in the housing and detects the combustion pressure. The housing has an attachment structural part attachable to the communication hole, the attachment structural part has a first attachment structural part to which a first seal member is attachable, and at least any one of the first attachment structural part and the second attachment structral part is provided with a tapered part having a diameter increasing as approching a rear end side that is an oppisite side of a direction to the combustion chamber from a front end side, and one of the first seal member and the second seal member is attachable to the tapered part for attaching the combustion pressure detection device to the communication hole.

It is preferable that the second attachment structural part is provided with the tapered part, and is arranged at the front end side in the direction to the combustion chamber relative to the first attachment structural part, and the first attachment structural part is provided with a face perpendicular to a centerline of the communication hole, and the first seal member is attachable onto the face.

Here, it is preferable that the housing has a fastening part that is fastened to the cylinder head by being screwed into a female screw formed on the communication hole, and the fastening part is provided between the first attachment structural part and the second attachment structural part. Thereby, it is possible to suppress adhesion of the fastening part due to an occurrence of heat strain because of a difference in a heat expansion coefficient between the housing and the cylinder head at the fastening part.

Moreover, it is preferable that the first attachment structural part is arranged at the rear end side in the direction to the combustion chamber and at a position that does not overlap the communication hole when the combustion pressure detection device is attached to the communication hole, and the first seal member is attached between the cylinder head and the first attachment structural part.

Moreover, it is preferable that the second attachment structural part is arranged inside the communication hole when the combustion pressure detection device is attached to the communication hole, and the second seal member is attached between the communication hole and the second attachment structural part.

Moreover, from another stand point, the present invention is an internal combustion engine equipped with a combustion pressure detection device for detecting combustion pressure inside a combustion chamber of the internal combustion engine, the internal combustion engine including the combustion pressure detection device having the above-mentioned features.

Advantageous Effects of Invention

According to the present invention, it is possible to suppress inflow of the combustion gas to the space formed with the cylinder head even when the front end of the combustion pressure detection device is downsized, and therefore loss of detection within one wavelength due to heat expansion of components configuring the combustion pressure detection device or detection error such as temperature drift can be prevented. Moreover, deformation such as adhesion of the fastening part due to a difference in a heat expansion coefficient between the housing and the cylinder head can be prevented.

DESCRIPTION OF EMBODIMENTS

Hereinafter, exemplary embodiments of the present invention will be described in detail with reference to attached drawings.
<First Exemplary Embodiment>

Figure 1:
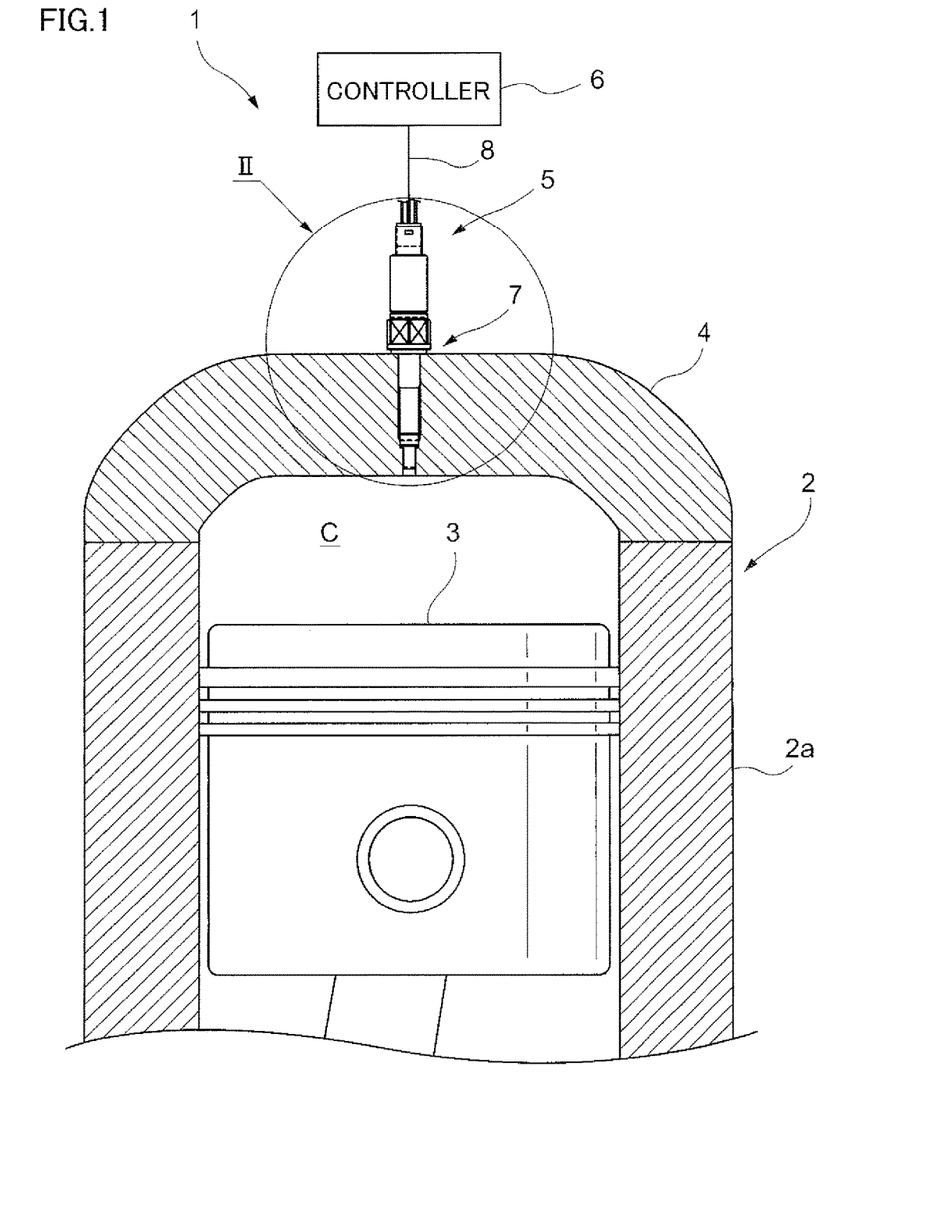
FIG. 1 is a schematic configuration diagram of an internal combustion engine according to the first exemplary embodiment.

FIG. 1 is a schematic configuration diagram of an internal combustion engine 1 according to the first exemplary embodiment.

Figure 2:
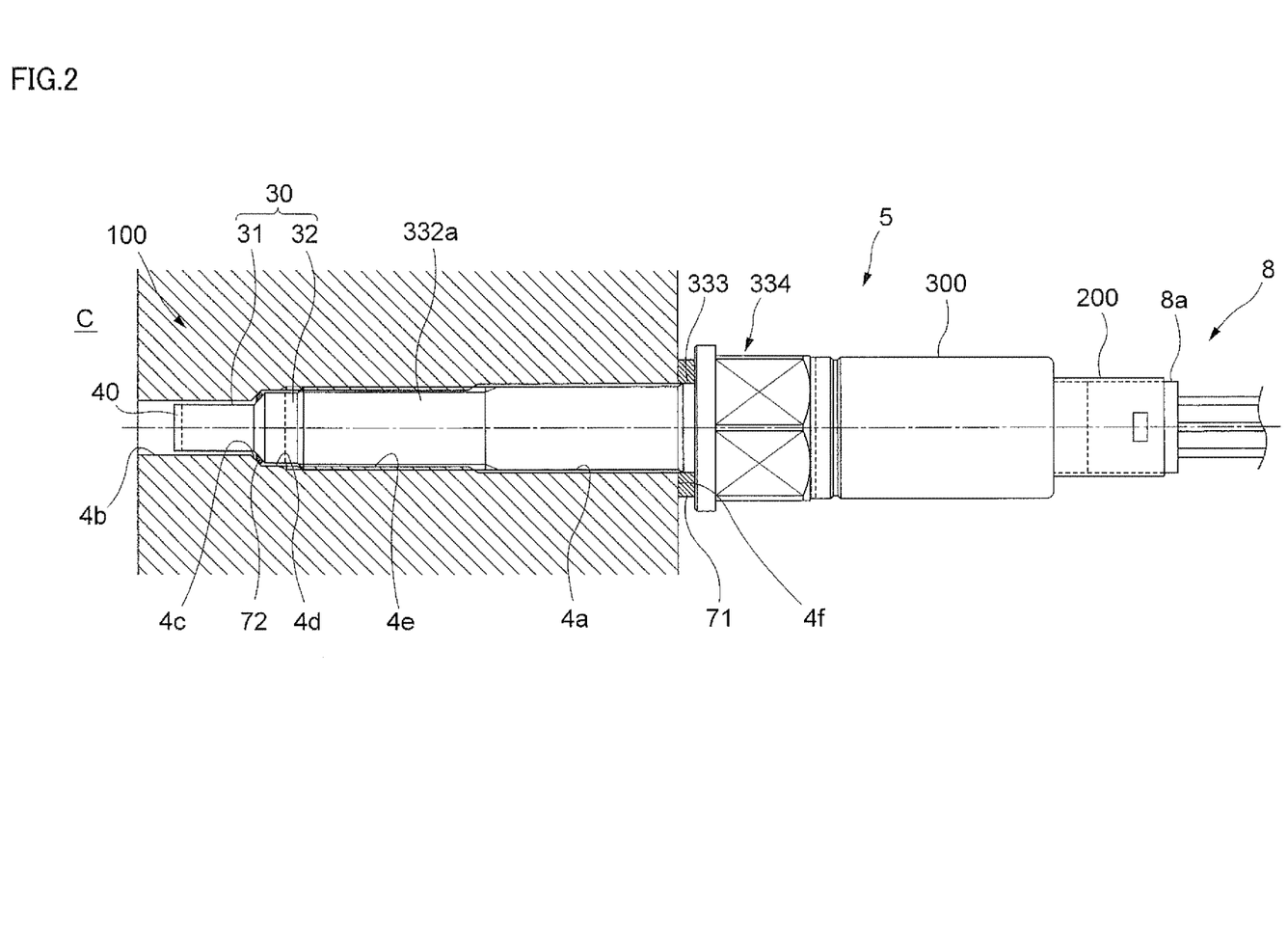
FIG. 2 is an enlarged diagram of a section II in FIG. 1.

FIG. 2 is an enlarged diagram of a section II in FIG. 1.

The internal combustion engine 1 is provided with: a cylinder block 2 that has a cylinder 2a; a piston 3 that is reciprocated in the cylinder 2a; and a cylinder head 4 that is fastened to the cylinder block 2 and forms a combustion chamber C with the cylinder 2a, the piston 3 and the like. Moreover, the internal combustion engine 1 is provided with: a pressure detection device 5 that is mounted on the cylinder head 4 and detects pressure inside the combustion chamber C; a controller 6 that controls actuation of the internal combustion engine 1 on the basis of the pressure detected by the pressure detection device 5; a seal member 7 that is interposed between the pressure detection device 5 and the cylinder head 4 to maintain airtightness of the inside of the combustion chamber C; and a transmission cable 8 that transmits an electric signal between the pressure detection device 5 and the controller 6.

A communication hole 4a that communicates the combustion chamber C and the outside with each other is formed in the cylinder head 4. The communication hole 4a has a first hole part 4b, an inclined part 4c with a diameter gradually increasing from a hole diameter of the first hole part 4b, and a second hole part 4d that has a larger hole diameter than the first hole part 4b. A female screw 4e into which a later-described male screw 332a of a housing 30 formed in the pressure detection device 5 is screwed is formed on a peripheral wall forming the second hole part 4d.

Hereinafter, detailed description will be given for the pressure detection device 5.

Figure 3:
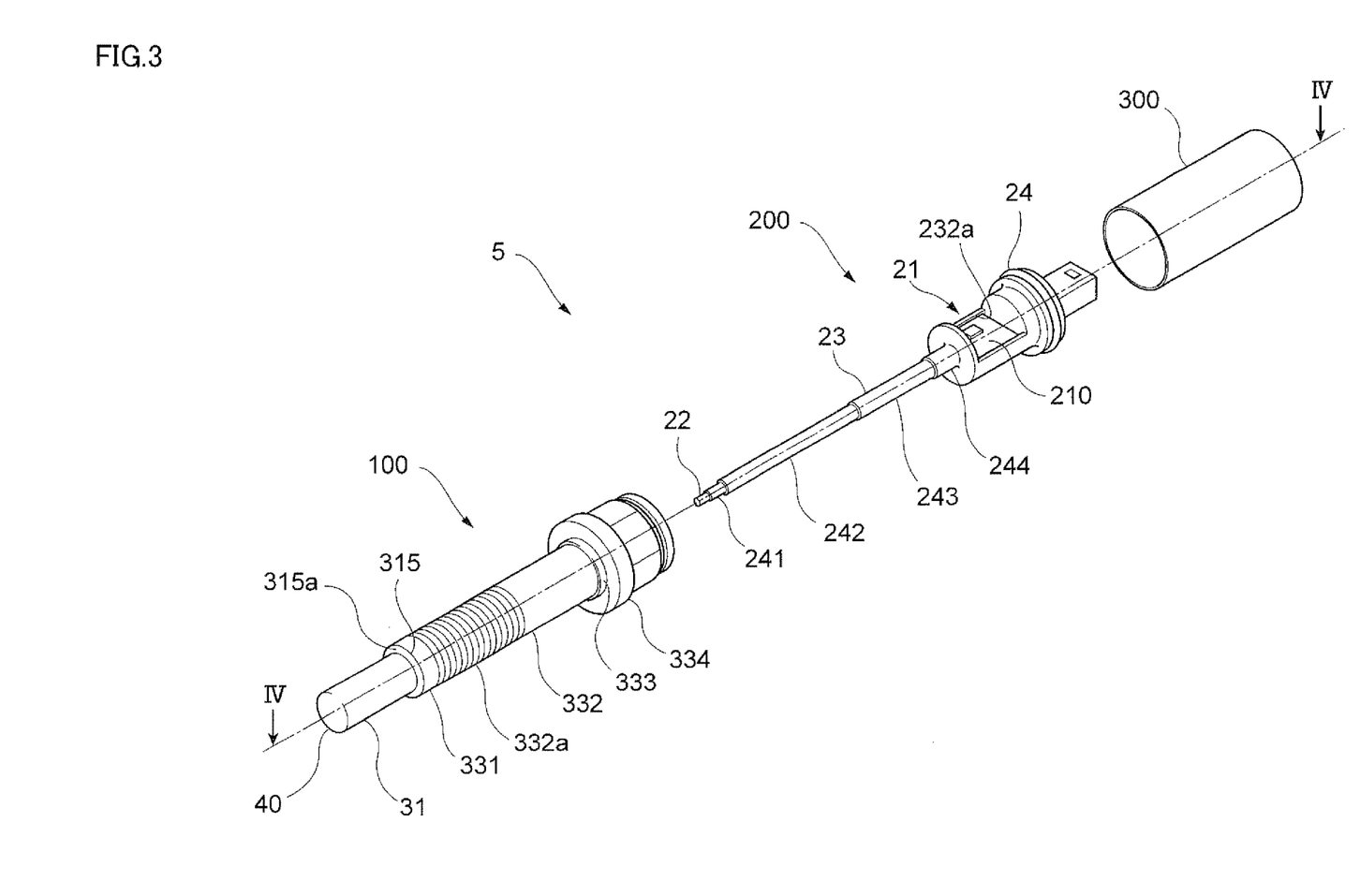
FIG. 3 is a schematic configuration diagram of the pressure detection device.
Figure 4:
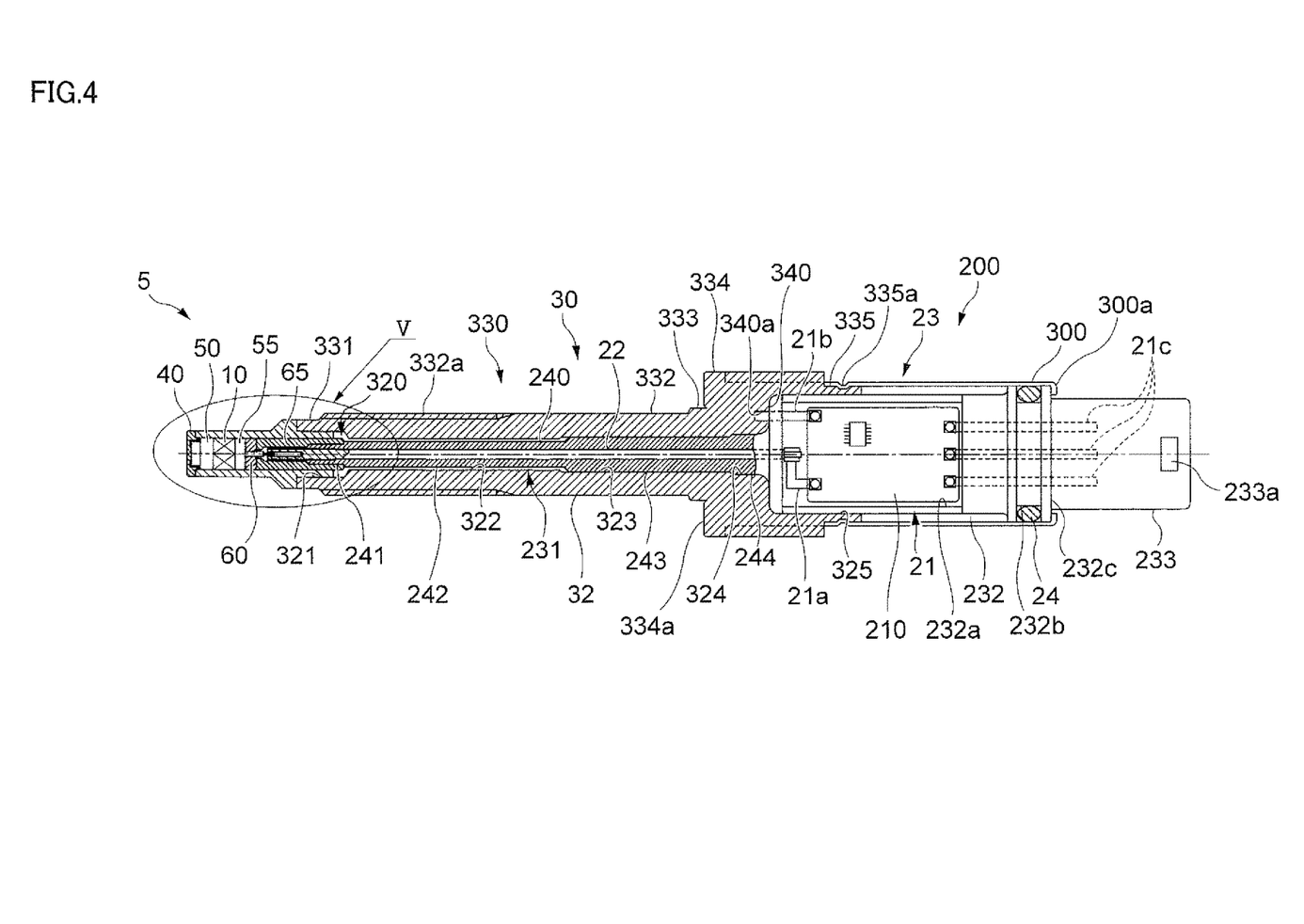
FIG. 4 is a cross-sectional diagram of a section IV-IV in FIG. 3.
Figure 5:
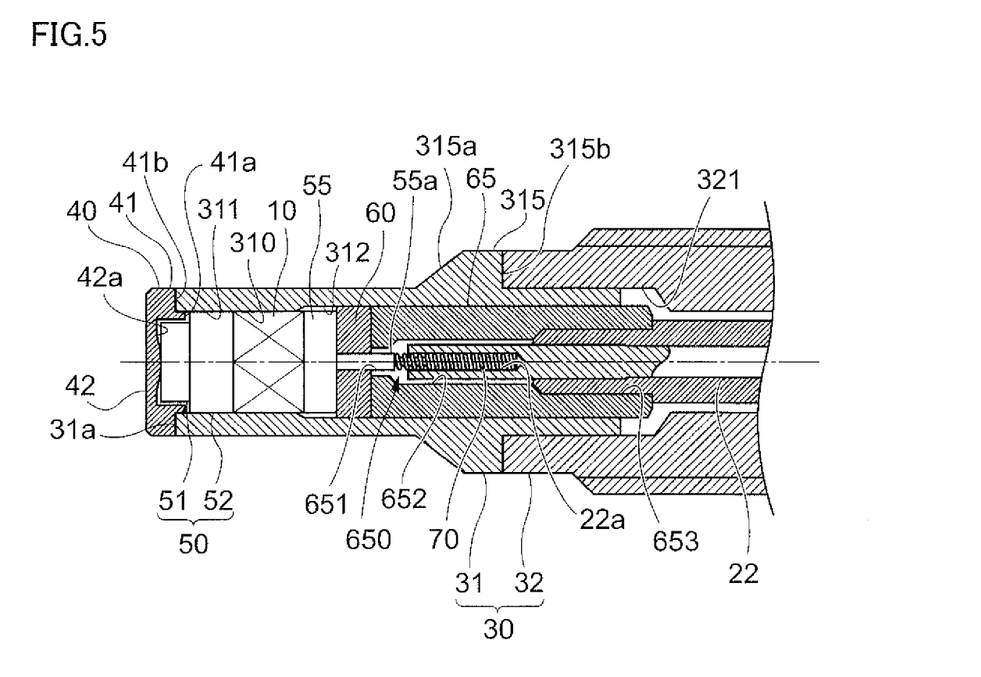
FIG. 5 is an enlarged diagram of a section V in FIG. 4.

FIG. 3 is a schematic configuration diagram of the pressure detection device 5. FIG. 4 is a cross-sectional diagram of a section IV-IV in FIG. 3. FIG. 5 is an enlarged diagram of a section V in FIG. 4.

The pressure detection device 5 is provided with: a sensor part 100 that has a piezoelectric element 10 transforming the pressure inside the combustion chamber C into an electric signal; a signal processor 200 that processes the electric signal from the sensor part 100; and a holding member 300 that holds the signal processor 200. When the pressure detection device 5 is mounted on the cylinder head 4, the pressure detection device 5 is inserted into the communication hole 4a formed in the cylinder head 4, firstly from a later-described diaphragm head 40 side of the sensor part 100. In the following description, the left side in FIG. 4 is referred to as a front end side of the pressure detection device 5, and the right side is referred to as a rear end side of the pressure detection device 5.

First, description will be given for the sensor part 100.

The sensor part 100 is provided with: the piezoelectric element 10 that transforms applied pressure into an electric signal; and a housing 30 which is formed into a tube and in which a cylindrical hole for containing the piezoelectric element 10 and so on is formed. Hereinafter, the centerline direction of the cylindrical hole formed in the housing 30 is simply referred to as a centerline direction.

Moreover, the sensor part 100 is provided with: the diaphragm head 40 which is provided to seal an opening of the housing 30 at the front end side and on which the pressure inside the combustion chamber C acts; a first electrode 50 that is provided between the diaphragm head 40 and the piezoelectric element 10; and a second electrode 55 that is arranged on an opposite side of the first electrode 50 with respect to the piezoelectric element 10.

Moreover, the sensor part 100 is provided with: an insulating ring 60 that electrically insulates the second electrode 55 and is made of alumina ceramic; a supporting member 65 that is provided at the rear end side relative to the insulating ring 60 and supports an end of a later-described cover member 23 of the signal processor 20; and a coil spring 70 that is interposed between the second electrode 55 and a later-described conducting member 22.

The piezoelectric element 10 has a piezoelectric body exhibiting a piezoelectric function having a piezoelectric longitudinal effect. The piezoelectric longitudinal effect indicates a function in which electric charges are generated on the surface of the piezoelectric body in an electric charge generation axis direction when external force acts on a stress application axis that is the same direction as the electric charge generation axis direction of the piezoelectric body. The piezoelectric element 10 according to the exemplary embodiment is contained inside the housing 30 so that the centerline direction corresponds to the direction of the stress application axis.

Next, a case in which a piezoelectric transversal effect is utilized for the piezoelectric element 10 is exemplified. The piezoelectric transversal effect indicates a function in which electric charges are generated on the surface of the piezoelectric body in the electric charge generation axis direction when external force acts on a stress application axis that is perpendicular to the electric charge generation axis of the piezoelectric body. A configuration in which plural piezoelectric bodies formed to be thin sheets are stacked can be accepted, electric charges generated on the piezoelectric bodies can be efficiently collected by stacking them as described above, and sensitivity of the sensor can be improved. As a piezoelectric single crystal used here, langasite-based crystals (langasite, langatate, langanite, LGTA) and crystals having the piezoelectric longitudinal effect and the piezoelectric transversal effect, and gallium phosphate can be exemplified. Note that, in the piezoelectric element 10 in the exemplary embodiment, a langasite single crystal is used as the piezoelectric body.

The housing 30 has a first housing 31 that is provided at a front end side, and a second housing 32 that is provided at a rear end side.

The first housing 31 is a thin-walled cylindrical component in which a cylindrical hole 310 is formed so that the diameter thereof is formed to be different in stages from the front end side to the rear end side. A protruding part 315 protruding from the outer peripheral surface is provided over the entire region in the peripheral direction at the central part of the outer peripheral surface in the centerline direction.

The hole 310 is configured of a first hole 311 and a second hole 312 with a hole diameter larger than a hole diameter of the first hole 311, which are formed in this order from the front end side toward the rear end side. The protruding part 315 has, at the front end, an inclined surface 315a that has a diameter gradually increasing from the front end side toward the rear end side, and, at the rear end, a vertical surface 315b that is vertical to the centerline direction.

The second housing 32 is a tubular component in which a cylindrical hole 320 is formed so that the diameter thereof is formed to be different in stages from the front end side toward the rear end side, and the second housing 32 has an outer peripheral surface 330 with a diameter formed to be different in stages from the front end side toward the rear end side, at the outer side thereof.

The hole 320 is configured of a first hole 321, a second hole 322 with a hole diameter smaller than a hole diameter of the first hole 321, a third hole 323 with a hole diameter larger than the hole diameter of the second hole 322, a fourth hole 324 with a hole diameter larger than the hole diameter of the third hole 323, and a fifth hole 325 with a hole diameter larger than the hole diameter of the fourth hole 324, which have been formed from the front end side toward the rear end side in this order.

The hole diameter of the first hole 321 is set to be equal to or lower than the diameter of the outer peripheral surface of the first housing 31 so that the front end of the second housing 32 is tightly fitted with the rear end of the first housing 31 (by insertion with pressure).

The outer peripheral surface 330 is configured of a first outer peripheral surface 331, a second outer peripheral surface 332 with an outer diameter larger than an outer diameter of the first outer peripheral surface 331, a third outer peripheral surface 333 with an outer diameter larger than the outer diameter of the second outer peripheral surface 332, a fourth outer peripheral surface 334 with an outer diameter larger than the outer diameter of the third outer peripheral surface 333, and a fifth outer peripheral surface 335 with an outer diameter smaller than the outer diameter of the fourth outer peripheral surface 334. At the front end of the second outer peripheral surface 332, a male screw 332a that is inserted into the female screw 4e of the cylinder head 4 is formed. A later-described first seal member 71 is loosely fitted with the third outer peripheral surface 333, and dimensional tolerance between the outer diameter of the third outer peripheral surface 333 and the inner diameter of the first seal member 71 is set at 0 to 0.2 mm, for example. The rear end of the fourth outer peripheral surface 334 is formed to be a regular hexagonal cylinder having six planes at equal intervals in the peripheral direction. The section formed into the regular hexagonal cylinder is a section which an industrial tool for fastening is fitted with and rotation force applied to the industrial tool is transmitted to when the pressure detection device 5 is fastened to the cylinder head 4. At the central part of the fifth outer peripheral surface 335 in the centerline direction, a concave part 335a that is concave from the outer peripheral surface is formed over the whole periphery.

Moreover, the second housing 32 is provided with an abutting face 340 on which the end face at a front end side of a later-described board covering part 232 of the cover member 23 of the signal processor 200 abuts, in a transition part for transitioning from the fourth hole 324 to the fifth hole 325 and at the front end of the fifth hole 325. In the abutting face 340, a pin insertion recessed part 340a into which a later-described second connecting pin 21b of a printed wiring board 210 of the signal processor 200 is inserted is formed.

Since the first housing 31 and the second housing 32 are located near the combustion chamber C, it is desirable to make them by using a material withstanding a used temperature environment of −40° C. to 350° C. at least. Specifically, it is desirable to use a high heat-resistant stainless steel such as SUS 630, SUS 316 and SUS 430 of the JIS standard, for example.

The diaphragm head 40 has a cylindrical part 41 formed into a cylinder, and an inner part 42 formed on the inner side of the cylindrical part 41.

The rear end of the cylindrical part 41 is tightly fitted with the front end of the first housing 31 of the housing 30 (by insertion with pressure), and an entering part 41a that enters the inside of the front end and an abutting face 41b which is formed into the same shape as an end face 31a of the front end and on which the end face 31a abuts at the fitting are provided.

The inner part 42 is a disk-shaped component provided to cover an opening at the front end side of the cylindrical part 41, and a protruding part 42a protruding toward the piezoelectric element 10 from the rear end-side surface is provided at the central part of the rear end-side surface. Moreover, a recessed part 42b that is recessed toward the piezoelectric element 10 from the front end-side surface is provided at the central part of the front end-side surface. The protruding part 42a and the recessed part 42b function as an example of a recessed part that is recessed toward the rear end side at the central region.

Since the diaphragm head 40 is located in the combustion chamber C with high temperature and high pressure, the material of the diaphragm head 40 is desired to be an alloy that has high elasticity and is excellent in durability, heat resistance, corrosion resistance and the like, and an example thereof is SUH 660.

The first electrode 50 is a cylindrical component in which the diameter is formed to be different in stages from the front end side toward the rear end side, and is configured of a first cylinder part 51 and a second cylinder part 52 with an outer diameter larger than an outer diameter of the first cylinder part 51. The outer diameter of the first cylinder part 51 is smaller than the inner diameter of the entering part 41a of the diaphragm head 40, and the outer diameter of the second cylinder part 52 is approximately the same as the hole diameter of the first hole 311 of the first housing 31. The end face at the front end side of the first cylinder part 51 is arranged to be in contact with the protruding part 42a of the inner part 42 of the diaphragm head 40, and the end face at the rear end side of the second cylinder part 52 is arranged to be in contact with the front end-side face of the piezoelectric element 10. By the contact between the outer peripheral surface of the second cylinder part 52 and the inner peripheral surface of the first housing 31 or the contact between the end face at the front end side of the first cylinder part 51 and the diaphragm head 40, the front end part of the piezoelectric element 10 is electrically connected with the housing 30.

The first electrode 50 is used for applying the pressure inside the combustion chamber C to the piezoelectric element 10, and is formed to have a size that allows the end face at the rear end side of the second cylinder part 52 as the end face at the piezoelectric element 10 side to push the whole surface of the end face of the piezoelectric element 10. Moreover, both end faces of the first electrode 50 in the centerline direction are formed to be parallel to each other (perpendicular to the centerline direction) and have smooth surfaces so that the pressure received from the diaphragm head 40 can equally act on the piezoelectric element 10.

As a material of the first electrode 50, stainless steel is exemplified.

The second electrode 55 is a cylindrical component, and an end face at the front end side is arranged to be in contact with the end face at the rear end side of the piezoelectric element 10, and the other end face at one end side is arranged to be in contact with the insulating ring 60. At the end face at the rear end side of the second electrode 55, a cylindrical protruding part 55a protruding from this end face toward the rear end side is provided. The protruding part 55a has a base end part at the end face side, and a tip part having the outer diameter smaller than the outer diameter of the base end part. The outer diameter of the protruding part 55a is set to be smaller than the inner diameter of the insulating ring 60 and the length of the protruding part 55a is set to be longer than the width (length in the centerline direction) of the insulating ring 60, so that the tip of the protruding part 55a is exposed from the insulating ring 60. The second electrode 55 is a component for applying a certain load to the piezoelectric element 10 between the second electrode 55 and the first electrode 50, and the end face at the piezoelectric element 10 side is formed to have a size that allows the end face to push the whole surface of the end face of the piezoelectric element 10, and is formed to be parallel to the end face of the piezoelectric element 10 and have a smooth surface. The outer diameter of the second electrode 55 is set to be smaller than the hole diameter of the second hole 312 of the first housing 31, and there is a space between the outer peripheral surface of the second electrode 55 and the inner peripheral surface of the first housing 31.

As a material of the second electrode 55, stainless steel is exemplified.

The insulating ring 60 is a cylindrical component formed of alumina ceramics or the like, the inner diameter (hole diameter at the central part) is set to be slightly larger than the outer diameter of the base end part of the protruding part 55a of the second electrode 55, and the outer diameter is set to be approximately the same as the hole diameter of the second hole 312 of the first housing 31. By arranging the second electrode 55 so that the protruding part 55a is inserted into the hole at the central part of the insulating ring 60, the second electrode 55 is arranged so that the center position corresponds to the center of the second hole 312 of the first housing 31.

The supporting member 65 is a tubular component that has a single outer peripheral surface, and has a hole 650 formed by plural cylinders with different diameters in the inside from the front end side toward the rear end side.

The hole 650 is configured of a first hole 651, a second hole 652 with a hole diameter larger than a hole diameter of the first hole 651, and a third hole 653 with a hole diameter larger than the hole diameter of the second hole 652, which are formed in this order from the front end side toward the rear end side. The hole diameter of the first hole 651 is larger than the outer diameter of the base end part of the protruding part 55a of the second electrode 55, and the protruding part 55a is exposed to the inside of the supporting member 65. The hole diameter of the second hole 652 is larger than the outer diameter of the front end of the later-described conducting member 22 of the signal processor 200. The hole diameter of the third hole 653 is smaller than the outer diameter of the end part of the later-described cover member 23 of the signal processor 200, and the cover member 23 is tightly fitted with a peripheral wall forming the third hole 653. Thereby, the supporting member 65 functions as a component supporting the end part of the cover member 23.

The coil spring 70 has the inner diameter not smaller than the outer diameter of the tip part of the protruding part 55a of the second electrode 55 and smaller than the outer diameter of the base end part, and the outer diameter smaller than a diameter of an insertion hole 22a of the later-described conducting member 22. While the tip part of the protruding part 55a of the second electrode 55 is inserted into the inner side of the coil spring 70, the coil spring 70 is inserted into the insertion hole 22a of the later-described conducting member 22. The length of the coil spring 70 is set at length that allows the coil spring 70 to be interposed between the second electrode 55 and the conducting member 22 in a compression state. As a material of the coil spring 70, an alloy that has high elasticity and is excellent in durability, heat resistance, corrosion resistance and the like is preferably used. Moreover, it is preferable to increase electric conduction by plating the surface of the coil spring 70 with gold.

Next, description will be given for the signal processor 200. The signal processor 200 is provided with: a circuit board part 21 that performs at least amplification processing on an electric signal as slight electric charges obtained from the piezoelectric element 10 of the sensor part 100; the conducting member 22 that guides the electric charges generated on the piezoelectric element 10 to the circuit board part 21 and is formed into a rod-like shape; the cover member 23 that covers the circuit board part 21, the conducting member 22 and the like; and an O-ring 24 that seals the circuit board part 21 and the like.

The circuit board part 21 has the printed wiring board 210 on which an electronic component and the like configuring a circuit for amplifying the slight electric charges obtained from the piezoelectric element 10 of the sensor part 100 are mounted. To the front end of the printed wiring board 210, a first connecting pin 21a for electrical connection of the rear end of the conducting member 22 and the second connecting pin 21b for ground connection and positioning are connected by solder or the like. Moreover, to the rear end of the printed wiring board 210, three third connecting pins 21c electrically connected with the controller 6 through a connector 8a at the front end of the transmission cable 8 are connected by solder or the like. The three third connecting pins 21c are used for supply of a power-supply voltage and supply of a GND voltage from the controller 6 to the printed wiring board 210 and supply of an output voltage from the printed wiring board 210 to the controller 6, respectively.

The conducting member 22 is a rod-shaped (cylindrical) component, and the insertion hole 22a into which the tip part of the protruding part 55a of the second electrode 55 is inserted is formed at the front end. The rear end of the conducting member 22 is electrically connected to the printed wiring board 210 of the circuit board part 21 through a conducting wire. As a material of the conducting member 22, brass, beryllium copper and the like are exemplified. In this case, brass is desirable from a viewpoint of workability and cost. Meanwhile, beryllium copper is desirable from a viewpoint of electric conductivity, strength at high temperature and reliability.

The cover member 23 has a conducting member covering part 231 that covers the outer periphery of the conducting member 22, the board covering part 232 that covers a side face and a bottom face of the printed wiring board 210 of the circuit board part 21, and a connector part 233 which covers a periphery of the third connecting pins 21c connected to the printed wiring board 210 and with which the connector 8a at the front end of the transmission cable 8 is fitted.

The conducting member covering part 231 covers the conducting member 22 so as to expose the front end of the conducting member 22 in the centerline direction, and is provided with an outer peripheral surface 240 with a diameter formed to be different in stages from the front end side toward the rear end side. The outer peripheral surface 240 is configured of a first outer peripheral surface 241, a second outer peripheral surface 242 with an outer diameter larger than an outer diameter of the first outer peripheral surface 241, a third outer peripheral surface 243 with an outer diameter larger than the outer diameter of the second outer peripheral surface 242, and a fourth outer peripheral surface 244 with an outer diameter larger than the outer diameter of the third outer peripheral surface 243. The diameter of the first outer peripheral surface 241 is larger than the hole diameter of the third hole 653 of the supporting member 65, and the front end of the conducting member covering part 231 is tightly fitted with the peripheral wall forming the third hole 653 of the supporting member 65 (by insertion with pressure). The diameter of the second outer peripheral surface 242 is formed to be smaller than the hole diameter of the second hole 322 of the second housing 32, and the diameter of the third outer peripheral surface 243 is formed to be smaller than the hole diameter of the third hole 323 of the second housing 32. Moreover, the diameter of the fourth outer peripheral surface 244 is larger than the hole diameter of the fourth hole 324 of the second housing 32, and the rear end of the conducting member covering part 231 is tightly fitted with a peripheral wall forming the fourth hole 324 of the second housing 32 (by insertion with pressure). Thereby, since at least the both ends of the conducting member covering part 231 in the centerline direction are supported by being in contact with the supporting member 65 and the second housing 32 respectively, it is possible to suppress an adverse effect on the conducting member 22 even in a bad vibration environment, and it is possible to avoid breaking of connections of the conducting member 22, bad connection and the like due to the vibration.

The board covering part 232 is basically a cylindrical section, and a rectangular opening 232a for installing the printed wiring board 210 in the inside is provided at the side surface thereof. Moreover, a ring groove 232b for the O-ring 24 for sealing the inside of the housing 30 and the installed part of the printed wiring board 210 is formed at the rear end side of the board covering part 232.

The connector part 233 is a thin-walled section that protrudes from an end face 232c at the rear end side of the board covering part 232 and is formed to cover the periphery of the three third connecting pins 21c connected to the printed wiring board 210. The rear end of the connector part 233 is opened, and it is possible for the connector 8a provided at the front end of the transmission cable 8 to enter the inside. Moreover, a hole 233a communicating the inside and the outside with each other is formed at the rear end side of the connector part 233, and by putting a hook provided on the connector 8a of the transmission cable 8 into this hole 233a, separation of the connector 8a of the transmission cable 8 from the connector part 233 is suppressed.

The covering member 23 configured as described above is formed of a material having an insulation property such as a resin. Moreover, the cover member 23 is integrally formed with the conducting member 22, the first connecting pin 21a, the second connecting pin 21b and the three third connecting pins 21c. More specifically, the cover member 23 is formed by extruding a heated resin into a mold in which the conducting member 22, the first connecting pin 21a, the second connecting pin 21b and the three third connecting pins 21c have been set.

For unitizing the signal processor 200, the printed wiring board 210 of the circuit board part 21 is inserted from the opening 232a of the cover member 23 that has been formed, and the printed wiring board 210 is installed at the central part of the board covering part 232. When the printed wiring board 210 is installed, tip ends of the first connecting pin 21a, the second connecting pin 21b and the three third connecting pins 21c are passed through through-holes penetrating in a thickness direction and are soldered. Then, the first connecting pin 21a and the conducting member 22 are connected with each other by using a conducting wire. Moreover, the O-ring 24 is mounted on the ring groove 232b of the board covering part 232 of the cover member 23. The O-ring 24 is a well-known O-shaped ring formed of a fluorinated rubber.

Next, description will be given for the holding member 300.

The holding member 300 is a thin-walled cylindrical component, and is provided with, at the rear end, a protruding part 300a protruding inward from the inner peripheral surface. After the holding member 300 is mounted on the second housing 32, a section corresponding to the concave part 335a provided in the fifth outer peripheral surface 335 is pressurized from the outside and thereby swaged. Thereby, the holding member 300 is difficult to move with respect to the housing 30, and movement of the signal processor 200 with respect to the housing 30 is suppressed.

The pressure detection device 5 configured as described above is assembled as described below.

First, the first housing 31 and the diaphragm head 40 are fitted with each other (by insertion with pressure) until the end face 31a of the first housing 31 and the abutting face 41b of the diaphragm head 40 come in contact with each other. Then, a contact section between the end face 31a of the first housing 31 and the abutting face 41b of the diaphragm head 40 is irradiated with a laser beam from a direction intersecting the centerline direction (for example, a direction perpendicular to the centerline direction), and the first housing 31 and the diaphragm head 40 are welded.

Thereafter, the first electrode 50 and the piezoelectric element 10 are inserted from the opening at the rear end side of the first housing 31. Then, components including the coil spring 70 having been mounted on the tip part of the protruding part 55a of the second electrode 55 and the insulating ring 60 having been inserted into the protruding part 55a of the second electrode 55 are inserted from the opening at the rear end side of the first housing 31. Subsequently, the supporting member 65 is inserted from the opening at the rear end side of the first housing 31.

Thereafter, in order to enhance sensitivity and linearity of the piezoelectric element 10, a predetermined load (preload) is applied on the piezoelectric element 10 in the first housing 31. In other words, the supporting member 65 is pressurized from the rear end side toward the front end side in the centerline direction with an exclusive tool mounted on the rear end of the supporting member 65. The supporting member 65 is continued to be pressurized until a displacement amount of the end face at the front end side of the inner part 42 of the diaphragm head 40 in the centerline direction becomes a predetermined length as compared that before the supporting member 65 is pressurized. When the end face at the front end side of the inner part 42 of the diaphragm head 40 is displaced by the predetermined length, the supporting member 65 and the first housing 31 are fixed. As a fixing method, laser beam irradiation from a direction intersecting the centerline direction (for example, the direction perpendicular to the centerline direction) is exemplified. The laser beam can be emitted to the whole circumference in the circumferential direction, or can be emitted in spots at equal intervals in the circumferential direction. After fixing the supporting member 65 and the first housing 31, the aforementioned exclusive tool is detached. Thereby, the state in which the preload acts on the piezoelectric element 10 in the first housing 31 is established.

Thereafter, the first housing 31 and the second housing 32 are fitted with each other (by insertion with pressure) until the vertical surface 315b of the protruding part 315 of the first housing 31 and the end face at the front end side of the second housing 32 come in contact with each other. Then, a contact section between the vertical surface 315b of the first housing 31 and the end face of the second housing 32 is irradiated with a laser beam from a direction intersecting the centerline direction (for example, the direction perpendicular to the centerline direction), and the first housing 31 and the second housing 32 are welded.

Thereafter, the signal processor 200 is inserted from the opening at the rear end side of the second housing 32 until the end face at the front end side of the board covering part 232 of the cover member 23 of the signal processor 200 abuts on the abutting face 340 of the second housing 32. At this time, the signal processor 200 is inserted so that the coil spring 70 mounted on the protruding part 55a of the second electrode 55 enters the insertion hole 22a of the conducting member 22 of the signal processor 200 and the second connecting pin 21b connected to the printed wiring board 210 enters the pin insertion recessed part 340a formed on the abutting face 340 of the second housing 32.

Thereafter, the holding member 300 is fitted with the signal processor 200 from the rear end side until the protruding part 300a of the holding member 300 abuts on the end face 232c of the board covering part 232 of the signal processor 200. By pressurizing a section of the holding member 300 corresponding to the concave part 335a of the fifth outer peripheral surface 335 of the second housing 32 in the state where the end face 232c of the signal processor 200 and the protruding part 300a of the holding member 300 are in contact with each other, the holding member 300 is swaged on the second housing 32. Thereby, the holding member 300 is difficult to move with respect to the housing 30, and the signal processor 200 is difficult to move with respect to the housing 30.

The pressure detection device 5 is assembled as described above.

Here, description will be given for an electric-connecting structure in the aforementioned pressure detection device 5.

First, the end face at the front end side of the piezoelectric element 10 is electrically connected with the housing 30 made of a metal through the first electrode 50 and the diaphragm head 40 made of a metal.

Meanwhile, the end face at the rear end side of the piezoelectric element 10 is electrically connected with the second electrode 55 made of a metal, and the second electrode 55 is electrically connected with the coil spring 70 made of a metal through the protruding part 55a. Moreover, the coil spring 70 is electrically connected with the conducting member 22 made of a metal, and the conducting member 22 is electrically connected with the printed wiring board 210. On the other hand, the outer diameter of the protruding part 55a of the second electrode 55 is smaller than the hole diameter of the first hole 651 of the supporting member 65, and the outer diameter of the front end of the conducting member 22 is smaller than the hole diameter of the second hole 652 of the supporting member 65. That is, the second electrode 55, the coil spring 70 and the conducting member 22 are not electrically connected with the supporting member 65. Thus, a transmission route from the second electrode 55 to the printed wiring board 210 through the coil spring 70 and the conducting member 22 is electrically insulated from the housing 30 made of a metal by the insulating ring 60 and the cover member 23 which are respectively formed of insulating bodies.

When the pressure detection device 5 configured as described above is mounted on the cylinder head 4, the diaphragm head 40 side of the sensor part 100 is firstly inserted into the communication hole 4a formed in the cylinder head 4, and the male screw 332a formed on the second housing 32 of the housing 30 is screwed into the female screw 4e formed on the communication hole 4a of the cylinder head 4.

By mounting the pressure detection device 5 on the cylinder head 4, the housing 30 is electrically connected with the cylinder head 4 made of a metal. Since the cylinder head 4 is in an electrically-grounded state, the front end of the piezoelectric element 10 is grounded through the housing 30 in the pressure detection device 5. Here, in this specific example, although a configuration in which the side surface of the piezoelectric element 10 and the inner wall surface of the housing 30 can be brought into contact with each other is employed, particular problems do not occur since the piezoelectric element 10 has a remarkably large resistance value because it is configured of an insulating body and electric charges to be generated in accordance with pressure change are generated at both ends of the piezoelectric element 10 in the centerline direction.

When the combustion engine 1 is actuated, combustion pressure is applied on the inner part 42 of the diaphragm head 40 of the sensor part 100. The combustion pressure applied on the diaphragm head 40 acts on the piezoelectric element 10 sandwiched between the first electrode 50 and the second electrode 55, and thereby electric charges corresponding to the combustion pressure is generated on the piezoelectric element 10. Then, the electric charges generated on the piezoelectric element 10 are applied to the circuit board part 21 through the second electrode 55, the coil spring 70 and the conducting member 22. After performing the amplification operation on the electric charges applied to the circuit board part 21 in the circuit board part 21, a voltage corresponding to the resultant electric charges is supplied to the controller 6 through the third connecting pins 21c connected to the circuit board part 21 and the transmission cable 8.

Next, description will be given for the seal member 7.

The seal member 7 has the first seal member 71 that is arranged between an end face 4f of a peripheral wall forming the communication hole 4a of the cylinder head 4 in a fastening direction of the pressure detection device 5 and the end face 334a at the front end side of the cylindrical section where the fourth outer peripheral surface 334 of the housing 30 of the pressure detection device 5 is provided, and that seals between the cylinder head 4 and the pressure detection device 5. Moreover, the seal member 7 has a second seal member 72 that is arranged between the inclined part 4c of the communication hole 4a of the cylinder head 4 and the inclined surface 315a of the first housing 31 of the housing 30 of the pressure detection device 5, and that seals between the cylinder head 4 and the pressure detection device 5.

An example of the first seal member 71 is a metal gasket formed by punching a metallic plate made of copper, stainless steel, aluminum or the like. The cross-sectional shape thereof is preferably formed to be an S-shape, or a rectangular-like shape. When the pressure detection device 5 is fastened to the cylinder head 4, the first seal member 71 deforms by receiving force in the fastening direction so that the length in the fastening direction is shortened, and increases airtightness inside the combustion chamber C. In other words, by screwing the pressure detection device 5 into the cylinder head 4, contact pressure generated between the first seal member 71 and the cylinder head 4 and contact pressure generated between the first seal member 71 and the housing 30 of the pressure detection device 5 increase. Thereby, leakage of combustion gas from between the first seal member 71 and the cylinder head 4 and between the first seal member 71 and the housing 30 of the pressure detection device 5 is suppressed.

An example of the second seal member 72 is an O-ring made of a fluorine-containing rubber (FKM) and formed into a ring-shape having a circular cross-section. When the pressure detection device 5 is fastened to the cylinder head 4, the second seal member 72 deforms by receiving force in a direction intersecting the fastening direction from the inclined part 4c of the communication hole 4a of the cylinder head 4 and the inclined surface 315a of the first housing 31 of the housing 30, and increases airtightness inside the combustion chamber C. In other words, by screwing the pressure detection device 5 into the cylinder head 4, contact pressure generated between the second seal member 72 and the inclined part 4c of the communication hole 4a of the cylinder head 4 and contact pressure generated between the second seal member 72 and the inclined surface 315a of the first housing 31 of the housing 30 increase. Thereby, leakage of the combustion gas from between the second seal member 72 and the cylinder head 4 and between the second seal member 72 and the housing 30 of the pressure detection device 5 is suppressed.

As described above, the internal combustion engine 1 according to the first exemplary embodiment is provided with: the cylinder head 4 as an example of a structural body configuring a combustion chamber; the pressure detection device 5 that has the housing 30 formed into a tubular-shape insertable into the communication hole 4a of the cylinder head 4; the first seal member 71 that seals between the cylinder head 4 and the pressure detection device 5 at the outside of the communication hole 4a of the cylinder head 4; and the second seal member 72 that seals between the cylinder head 4 and the pressure detection device 5 at the inside of the communication hole 4a. Thereby, in addition to suppressing the leakage of the combustion gas to the outside of the internal combustion engine 1 at the first seal member 71, inflow of the combustion gas between the housing 30 of the pressure detection device 5 and the cylinder head 4 is suppressed at the second seal member 72. Therefore, it is possible to suppress an occurrence of a detection error due to heat expansion of components configuring the pressure detection device 5.

The housing 30 of the pressure detection device 5 is fastened to the cylinder head 4 by screwing the housing 30 into the female screw 4e formed on the communication hole 4a of the cylinder head 4, and the second seal member 72 is attached, at the front end side of the fastening part, to such a position that the second seal member 72 is entirely contained inside the communication hole 4a. Thereby, since the second seal member 72 seals between the pressure detection device 5 and the cylinder head 4 at the upstream side with respect to the fastening part between them, inflow of the combustion gas to the fastening part is suppressed. Accordingly, it is possible to suppress adhesion of the fastening part due to an occurrence of heat strain at the fastening part because of a difference in a heat expansion coefficient between the housing 30 and the cylinder head 4 made of aluminum.

The first housing 31 of the housing 30 has the inclined surface 315a that is a tapered part having the diameter enlarging as approaching the rear end side from the front end side, and the communication hole 4a of the cylinder head 4 is provided with the inclined part 4c having the diameter enlarging as approaching the rear end side from the front end side. In the internal combustion engine 1 according to the first exemplary embodiment, the second seal member 72 is arranged between the inclined surface 315a of the housing 30 and the inclined part 4c of the cylinder head 4 while the inclined surface 315a of the housing 30 and the inclined part 4c of the cylinder head 4 are caused to face each other in the state where the pressure detection device 5 and the cylinder head 4 are fastened to each other. Moreover, the size of the second seal member 72 is set at a size that allows the second seal member 72 to come in contact with the inclined surface 315a of the housing 30 and the inclined part 4c of the communication hole 4a and to be pressed in a direction intersecting the insertion direction (centerline direction) by the inclined surface 315a and the inclined part 4c so that the second seal member 72 can be deformable in the direction intersecting the insertion direction along with the inclined surface 315a and the inclined part 4c when the pressure detection device 5 is inserted into and fastened to the communication hole 4a of the cylinder head 4. Thereby, it is possible for the second seal member 72 to seal between the pressure detection device 5 and the cylinder head 4 with high accuracy.

The internal combustion engine 1 according to the first exemplary embodiment is provided with, in addition to the first seal member 71 that is compressed in the same direction as the fastening direction of the pressure detection device 5 and seals between the pressure detection device 5 and the cylinder head 4, the second seal member 72 that is compressed in the direction intersecting the fastening direction. Accordingly, the fastening force of the pressure detection device 5 is received by the end face 4f and the inclined part 4c of the cylinder head 4. Therefore, the force generated on the inclined part 4c of the cylinder head 4 is smaller than that in the case where all of the fastening force of the pressure detection device 5 is received by the inclined part 4c. Consequently, even if the diameter of the front end of the housing 30 of the pressure detection device 5 is decreased while the fastening force remains the same, it is possible to prevent force acting on the inclined part 4c of the cylinder head 4 made of aluminum and surface pressure occurring at the cylinder head 4 due to the force from becoming larger than allowable values. The detailed description thereof will be given below.

Figure 6:
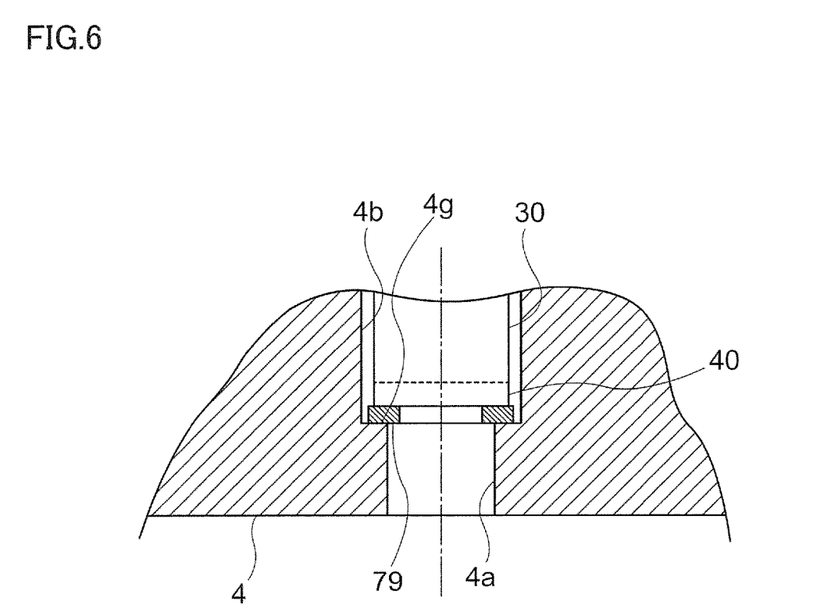
FIG. 6 is a diagram showing a comparative example for comparison with the seal configuration of the internal combustion engine according to the first exemplary embodiment.

FIG. 6 is a diagram showing a comparative example for comparison with the seal configuration of the internal combustion engine 1 according to the first exemplary embodiment.

As shown in FIG. 6, a seal configuration only by a publicly-known gasket 79 arranged between the front end surface of the cylindrical part 41 of the diaphragm head 40 of the pressure detection device 5 and an end face 4g of the cylinder head 4 is considered as a seal configuration between the pressure detection device 5 and the cylinder head 4. In this configuration, a seal between them can be provided by causing the gasket 79 to be compressed in the fastening direction. However, in this configuration, all of the fastening force of the pressure detection device 5 is received by the end face 4g of the cylinder head 4. Accordingly, if the diameter at the front end of the housing 30 of the pressure detection device 5 is decreased while the fastening force remains the same, the diameter of the gasket 79 is also decreased, and the surface pressure occurring at the cylinder head 4 is increased by decreasing the diameter of the gasket 79. Consequently, the surface pressure applied on the housing 30 is increased and therefore exceeds the allowable value, so that the gasket 79 is broken, and there is a possibility that the combustion gas may leak to the outside of the internal combustion engine 1 or the combustion gas may flow between the pressure detection device 5 and the cylinder head 4.

Next, in the internal combustion engine 1 according to the first exemplary embodiment, a seal configuration by the gasket 79 arranged between the front end surface of the cylindrical part 41 of the diaphragm head 40 of the pressure detection device 5 and the end face 4g of the cylinder head 4 shown in FIG. 6 in addition to the first seal member 71 arranged between the end face 4f of the cylinder head 4 and the pressure detection device 5 is considered. In this configuration, both of the first seal member 71 and the gasket 79 are compressed in the fastening direction and seal between them, and the fastening force of the pressure detection device 5 is received by the end face 4f and the end face 4g of the cylinder head 4. In this case, depending on the dimensional variation of each component, almost all of the fastening force of the pressure detection device 5 is generated on the end face 4g of the cylinder head 4, and there is a possibility that the surface pressure generated on the cylinder head 4 or the surface pressure generated on the housing 30 may excess the allowable value. Consequently, there is a possibility that the combustion gas may flow between the pressure detection device 5 and the cylinder head 4.

Meanwhile, the second seal member 72 of the internal combustion engine 1 according to the first exemplary embodiment is arranged between the inclined surface 315a of the housing 30 and the inclined part 4c of the communication hole 4a which are inclined with respect to the fastening direction of the pressure detection device 5. Thus, even if the dimension of each part varies, a gap between the inclined surface 315a of the housing 30 and the inclined part 4c of the communication hole 4a is difficult to be decreased at fastening the pressure detection device 5. Consequently, the fastening force of the pressure detection device 5 is received by the end face 4f and the end face 4c of the cylinder head 4. For this reason, in the configuration of the internal combustion engine 1 according to the first exemplary embodiment, it is possible to prevent the force acting on the inclined part 4c of the cylinder head 4 and the surface pressure occurring on the cylinder head 4 and the surface pressure occurring on the housing 30 due to the force from increasing beyond the allowable values even if the diameter at the front end of the housing 30 of the pressure detection device 5 is decreased while the fastening force remains the same.

In order to achieve the aforementioned configuration of the internal combustion engine 1, the pressure detection device 5 according to the first exemplary embodiment is provided with: the third outer peripheral surface 333 of the second housing 32 of the housing 30 as an example of a first attachment structural part to which the first seal member 71 is attachable; and the inclined surface 315a of the first housing 31 that is provided on the front end side with respect to the third outer peripheral surface 333 and is an example of a second attachment structural part to which the second seal member 72 is attachable.

The inclined surface 315a of the first housing 31 is a tapered part with a diameter increasing as approaching the rear-end side from the front end side, and, after the second seal member 72 is provided to the inclined surface 315a and the housing 30 is inserted into the communication hole 4a of the cylinder head 4, the second seal member 72 is brought into contact with the inclined part 4c as an example of a wall of the communication hole 4a and is pressed in the direction intersecting the insertion direction. Thereby, suppression of inflow of the combustion gas to a space between the pressure detection device 5 and the cylinder head 4 is achieved by the simple configuration.

Note that, although the pressure detection device 5 and the seal member 7 are regarded as individual components in the aforementioned first exemplary embodiment, the seal member 7 can be regarded as a component configuring part of the pressure detection device 5. In other words, the pressure detection device 5 can be regarded as a device that is provided with: the housing 30; the piezoelectric element 10 as an example of a detector, the first electrode 50 and the second electrode 55; the first seal member 71; and the second seal member 72.

<Second Exemplary Embodiment>

Figure 7A:
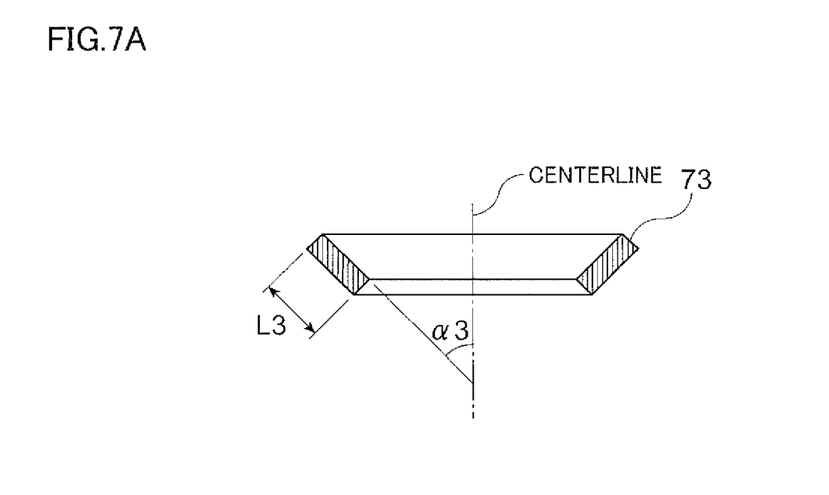
FIGS. 7A and 7B are schematic configuration diagrams of the second seal member of the internal combustion engine according to the second exemplary embodiment.
Figure 7B:
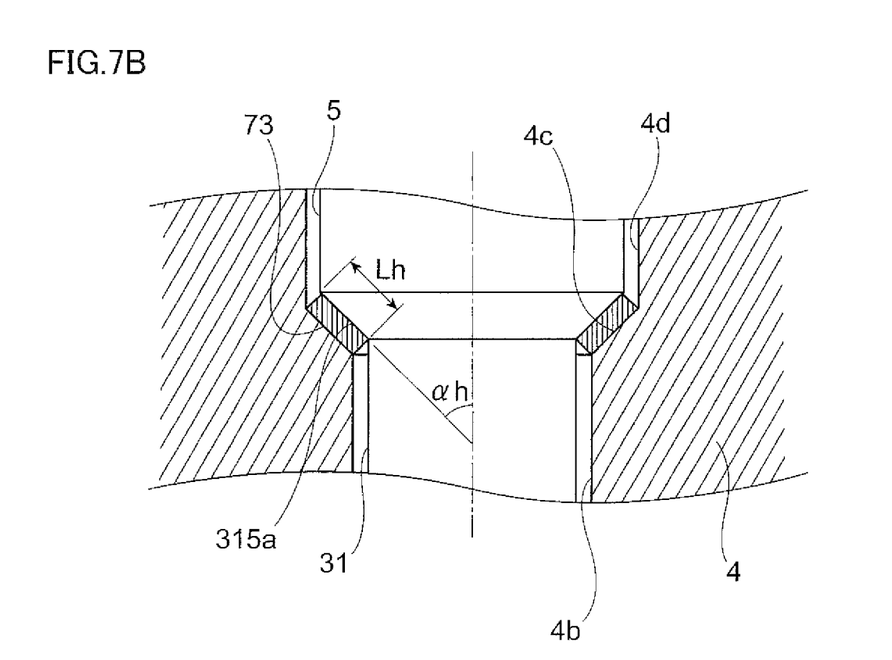

The internal combustion engine 1 according to the second exemplary embodiment has a different second seal member 73 of the seal member 7 as compared to the internal combustion engine 1 according to the first exemplary embodiment. Hereinafter, different points are described.

FIGS. 7A and 7B are schematic configuration diagrams of the second seal member 73 of the internal combustion engine 1 according to the second exemplary embodiment. FIG. 7A is a cross-sectional diagram of the second seal member 73, and FIG. 7B is a partial cross-sectional diagram showing a state where the second seal member 73 seals between the cylinder head 4 and the pressure detection device 5.

The second seal member 73 according to the second exemplary embodiment has a thin wall, and is a component formed into a ring shape. Although the cross-sectional shape of the second seal member 73 is a rectangle, the long side and the short side thereof are inclined with respect to the centerline direction. Further, an inclined angle α3 is set to be approximately equal to an inclined angle αh of the inclined surface 315a of the first housing 31 of the pressure detection device 5. Moreover, length L3 of the long side is set to be equal to or smaller than length Lh of the inclined surface 315a of the first housing 31 in the inclination direction.

As a material of the second seal member 73 according to the second exemplary embodiment, fluorine resins excellent in heat resistance are exemplified. Among them, polytetrafluoroethylene (PTFE) is preferable. If the second seal member 73 is a fluorine resin, it is possible to make the aforementioned shape easily since it is excellent in mechanical workability for cutting work or the like and formability using a molding tool.

Also in the internal combustion engine 1 according to the second exemplary embodiment, in a state where the pressure detection device 5 and the cylinder head 4 are fastened to each other, while the inclined surface 315a of the housing 30 and the inclined part 4c of the cylinder head 4 face each other, the second seal member 73 is arranged between them. Moreover, the thickness of the second seal member 73 (length of the short side) is set at a size that allows the second seal member 73 to be brought into contact with the inclined surface 315a of the housing 30 and the inclined part 4c of the communication hole 4a when the pressure detection device 5 is inserted into and fastened to the communication hole 4a of the cylinder head 4. In other words, it is set at the size that allows the second seal member 73 to be pressed in the direction intersecting the insertion direction (centerline direction) by the inclined surface 315a and the inclined part 4c so that the second seal member 73 can be deformable in the direction intersecting the insertion direction along with the inclined surface 315a and the inclined part 4c. Thereby, it is possible for the second seal member 73 to seal between the pressure detection device 5 and the cylinder head 4 with high accuracy, and it is possible to suppress inflow of the combustion gas to a space between the pressure detection device 5 and the cylinder head 4.

<Third Exemplary Embodiment>

Figure 8A:
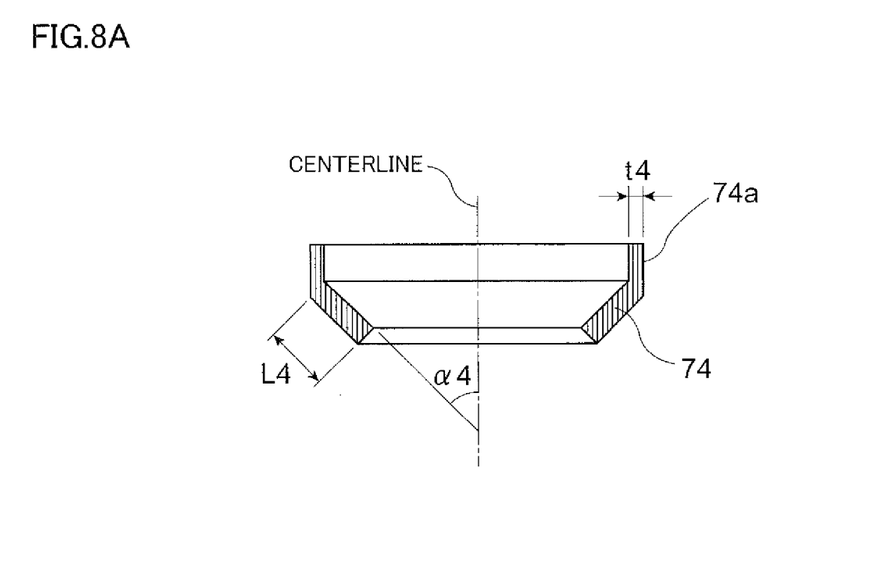
FIGS. 8A and 8B are schematic configuration diagrams of the second seal member of the internal combustion engine according to the third exemplary embodiment.
Figure 8B:
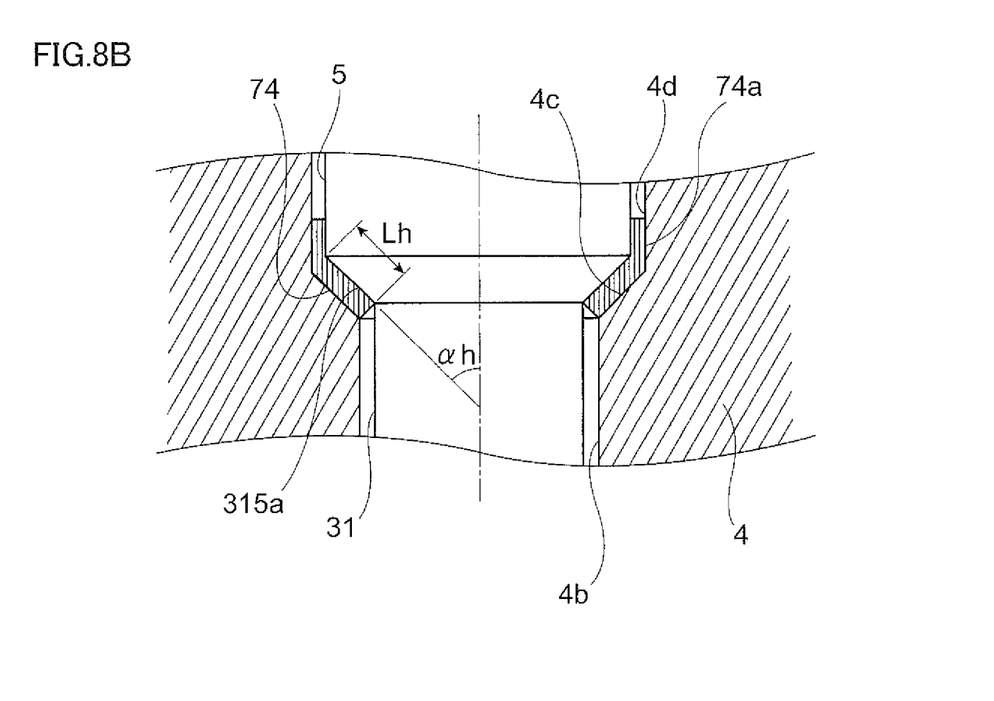

The internal combustion engine 1 according to the third exemplary embodiment has a different second seal member 74 of the seal member 7 as compared to the internal combustion engine 1 according to the first exemplary embodiment. Hereinafter, different points are described.

FIGS. 8A and 8B are schematic configuration diagrams of the second seal member 74 of the internal combustion engine 1 according to the third exemplary embodiment. FIG. 8A is a cross-sectional diagram of the second seal member 74, and FIG. 8B is a partial cross-sectional diagram showing a state where the second seal member 74 seals between the cylinder head 4 and the pressure detection device 5.

The second seal member 74 according to the third exemplary embodiment differs from the second seal member 73 according to the second exemplary embodiment in the following point. That is, the second seal member 74 according to the third exemplary embodiment is different in that an extension part 74a extending upward in the centerline direction from the upper end of the second seal member 73 according to the second exemplary embodiment in the centerline direction (when it is viewed in FIGS. 8A and 8B) is provided. The extension part 74a is a thin-walled cylindrical section. The inner diameter of the extension part 74a is set so as to be tightly fitted with the outer diameter of the protruding part 315 of the first housing 31 of the housing 30 (by insertion with pressure). Moreover, thickness t4 of the extension part 74a is set so that the outer diameter of the extension part 74a is equal to or smaller than the hole diameter of the second hole 4d of the cylinder head 4 in a state where the extension part 74a is fitted with the protruding part 315 of the first housing 31.

Also in the internal combustion engine 1 according to the third exemplary embodiment, in a state where the pressure detection device 5 and the cylinder head 4 are fastened to each other, while the inclined surface 315a of the housing 30 and the inclined part 4c of the cylinder head 4 face each other, the second seal member 74 is arranged between them. Moreover, the thickness of the inclined part of the second seal member 74 is set at a size that allows the second seal member 74 to be brought into contact with the inclined surface 315a of the housing 30 and the inclined part 4c of the communication hole 4a when the pressure detection device 5 is inserted into and fastened to the communication hole 4a of the cylinder head 4. In other words, it is set at the size that allows the second seal member 74 to be pressed in the direction intersecting the insertion direction (centerline direction) by the inclined surface 315a and the inclined part 4c so that the second seal member 74 can be deformable in the direction intersecting the insertion direction along with the inclined surface 315a and the inclined part 4c. Thereby, it is possible for the second seal member 74 to seal between the pressure detection device 5 and the cylinder head 4 with high accuracy, and it is possible to suppress inflow of the combustion gas to a space between the pressure detection device 5 and the cylinder head 4.

Further, in the second seal member 74 according to the third exemplary embodiment, part of the inclined part deformed due to a press of the second seal member 74 by the inclined surface 315a of the housing 30 and the inclined part 4c of the communication hole 4a reaches the extension part 74a, and the extension part 74a is easily pressed to the outer peripheral surface of the protruding part 315 of the housing 30 and a wall surface forming the second hole 4d of the cylinder head 4. Consequently, an area brought into contact with the cylinder head 4 and the pressure detection device 5 is increased by using the second seal member 74 according to the third exemplary embodiment, and sealing performance is improved. Accordingly, it is possible to suppress inflow of the combustion gas to a space between the pressure detection device 5 and the cylinder head 4 with higher accuracy.

REFERENCE SIGNS LIST

1 . . . Internal combustion engine
2 . . . Cylinder block
3 . . . Piston
4 . . . Cylinder head
5 . . . Pressure detection device
6 . . . Controller
7 . . . Seal member
8 . . . Transmission cable
10 . . . Piezoelectric element
21 . . . Circuit board part
22 . . . Conducting member
23 . . . Cover member
24 . . . O-ring
30 . . . Housing
40 . . . Diaphragm head
50 . . . First electrode
55 . . . Second electrode
60 . . . Insulating ring
65 . . . Supporting member
70 . . . Coil spring
71 . . . First seal member
72, 73, 74 . . . Second seal member 100 . . . Sensor part
200 . . . Signal processor
300 . . . Holding member

The invention claimed is:

1. A combustion pressure detection device for detecting combustion pressure inside a combustion chamber of an internal combustion engine, the combustion pressure detection device being attachable to a communication hole communicating an inside of a cylinder head configuring the combustion chamber and an outside thereof, the combustion pressure detection device comprising:
   a housing;
   a first seal member;
   a second seal member; and
   a detector that is located in the housing and detects the combustion pressure, wherein
   the housing has an attachment structural part attachable to the communication hole,
   the attachment structural part has a first attachment structural part which the first seal member is attached to and pressed against, and a second attachment structural part which the second seal member is attached to and pressed against,
   at least any one of the first attachment structural part and the second attachment structural part is provided with a tapered part having a sloped face and a diameter increasing as approaching a rear end side that is an opposite side of a direction to the combustion chamber from a front end side, and one of the first seal member and the second seal member is attached to and pressed against the sloped face of the tapered part for attaching the combustion pressure detection device to the communication hole,
   the first seal member is attached and pressed between the cylinder head and the first attachment structural part,
   the second seal member is attached and pressed between the communication hole and the second attachment structural part,
   the first seal member deforms in a fastening direction.

2. The combustion pressure detection device according to claim 1, wherein
   the second attachment structural part is provided with the tapered part, and is arranged at the front end side in the direction to the combustion chamber relative to the first attachment structural part, and
   the first attachment structural part is provided with a face perpendicular to a centerline of the communication hole, and the first seal member is attached to and pressed against the face.

3. The combustion pressure detection device according to claim 1, wherein
   the housing has a fastening part that is fastened to the cylinder head by being screwed into a female screw formed on the communication hole, and the fastening part is provided between the first attachment structural part and the second attachment structural part.

4. The combustion pressure detection device according to claim 1, wherein
   the first attachment structural part is arranged at the rear end side in the direction to the combustion chamber and at a position that does not overlap the communication hole when the combustion pressure detection device is attached to the communication hole.

5. The combustion pressure detection device according to claim 1, wherein
   the second attachment structural part is arranged inside the communication hole when the combustion pressure detection device is attached to the communication hole.

6. An internal combustion engine equipped with a combustion pressure detection device for detecting combustion pressure inside a combustion chamber of the internal combustion engine, the internal combustion engine comprising:
   the combustion pressure detection device according to claim 1.

7. The combustion pressure detection device according to claim 1, wherein
   the first seal member is removably attached to the first attachment structural part and the second seal member is removably attached to the second attachment structural part.

8. The combustion pressure detection device according to claim 1, wherein
   the first seal member is configured to seal between the cylinder head and the housing by being in direct contact with the cylinder head and the housing.

* * * * *